(12) United States Patent
Wadhwa et al.

(10) Patent No.: US 10,360,242 B2
(45) Date of Patent: Jul. 23, 2019

(54) AUTOMATED SERVER ANALYSIS AND PATCHING FOR ENABLING RELATIONAL DATABASE MIGRATION TO A CLOUD NETWORK

(71) Applicant: Bank of America Corporation, Charlotte, NC (US)

(72) Inventors: Vishal Wadhwa, Kukatpally (IN); Ashok Kumar, Hyderabad (IN); Sunil Gaddam, Hyderabad (IN); Mangesh Chore, Hyderabad (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 59 days.

(21) Appl. No.: 15/366,416

(22) Filed: Dec. 1, 2016

(65) Prior Publication Data
US 2018/0157476 A1    Jun. 7, 2018

(51) Int. Cl.
*G06F 8/61* (2018.01)
*G06F 16/28* (2019.01)
*H04L 29/08* (2006.01)

(52) U.S. Cl.
CPC .............. *G06F 16/284* (2019.01); *G06F 8/61* (2013.01); *H04L 67/06* (2013.01); *H04L 67/10* (2013.01); *H04L 67/34* (2013.01)

(58) Field of Classification Search
CPC .................................................... G06F 17/303
See application file for complete search history.

(56) References Cited

U.S. PATENT DOCUMENTS

| | | | |
|---|---|---|---|
| 6,510,350 B1 | 1/2003 | Steen, III et al. | |
| 6,563,800 B1 | 5/2003 | Salo et al. | |
| 7,257,705 B2* | 8/2007 | Flam | G06F 16/214 |
| | | | 713/100 |
| 7,356,679 B1* | 4/2008 | Le | G06F 9/45558 |
| | | | 713/1 |
| 7,503,042 B2 | 3/2009 | Henrickson et al. | |

(Continued)

OTHER PUBLICATIONS

Agarwal, Sharad, et al. "Volley: Automated data placement for geo-distributed cloud services." (2010). (Year: 2010).*

(Continued)

*Primary Examiner* — Matthew J Brophy
(74) *Attorney, Agent, or Firm* — Michael A. Springs; Moore & Van Allen PLLC; James C. Edwards

(57) ABSTRACT

The invention provides a server administration tool for migration of a relational database to a cloud server environment. The server administration tool includes a database migration tool a server patching tool to monitor and maintain a server system. The database migration tool allows for the migration and upload of a database stored on a source server to a target cloud server. The migrated database may be directly uploaded to the target server or hosted on a virtual machine. The server patching tool allows for patching of an initially incompatible source server enabling migration of a stored database to a new target server. The tool analyzes a database stored on a source server for compatibility with a new, target cloud server to determine whether an implemented patch would succeed or fail. In this way, errors reported by the tool, may be rectified without requiring costly, additional server downtime.

20 Claims, 9 Drawing Sheets

(56) References Cited

U.S. PATENT DOCUMENTS

| | | | |
|---|---|---|---|
| 7,640,406 B1 * | 12/2009 | Hagerstrom | G06F 16/1744 711/159 |
| 7,664,795 B2 * | 2/2010 | Balin | G06F 16/214 707/661 |
| 8,468,139 B1 * | 6/2013 | O'Connor | G06F 21/00 707/654 |
| 8,881,139 B1 * | 11/2014 | Acacio | G06F 8/76 717/177 |
| 9,176,773 B2 | 11/2015 | Fries et al. | |
| 9,235,356 B2 | 1/2016 | Backa | |
| 9,239,690 B2 | 1/2016 | Backa | |
| 9,282,166 B2 | 3/2016 | Markley et al. | |
| 9,363,190 B2 * | 6/2016 | Beloglazov | H04L 47/70 |
| 9,405,530 B2 | 8/2016 | Islam et al. | |
| 9,519,663 B2 | 12/2016 | Engelko et al. | |
| 9,552,495 B2 | 1/2017 | Yang et al. | |
| 9,612,765 B2 | 4/2017 | Huang et al. | |
| 9,613,116 B2 | 4/2017 | Bryan et al. | |
| 9,632,814 B2 | 4/2017 | Bonilla et al. | |
| 9,633,406 B2 | 4/2017 | Bala et al. | |
| 9,733,921 B1 * | 8/2017 | Saenz | G06F 8/65 |
| 9,778,923 B2 * | 10/2017 | Kochhar | G06F 16/214 |
| 2002/0107871 A1 | 8/2002 | Wyzga et al. | |
| 2004/0133610 A1 * | 7/2004 | Flam | G06F 16/214 |
| 2005/0149537 A1 * | 7/2005 | Balin | G06F 16/214 |
| 2009/0049438 A1 | 2/2009 | Draper et al. | |
| 2010/0088690 A1 * | 4/2010 | Levi | G06F 8/65 717/168 |
| 2010/0287263 A1 | 11/2010 | Liu et al. | |
| 2010/0318609 A1 | 12/2010 | Lahiri et al. | |
| 2011/0055377 A1 | 3/2011 | Dehaan | |
| 2012/0303654 A1 | 11/2012 | Ferris | |
| 2013/0262689 A1 | 10/2013 | Schmidt et al. | |
| 2013/0325906 A1 * | 12/2013 | Qiu | G06F 16/214 707/803 |
| 2014/0149591 A1 | 5/2014 | Bhattacharya et al. | |
| 2015/0039764 A1 * | 2/2015 | Beloglazov | H04L 47/70 709/226 |
| 2015/0096011 A1 | 4/2015 | Watt | |
| 2015/0331923 A1 * | 11/2015 | Kim | G06Q 30/01 707/617 |
| 2015/0363452 A1 | 12/2015 | Tu et al. | |
| 2016/0034302 A1 | 2/2016 | Fries et al. | |
| 2016/0125015 A1 | 5/2016 | Zwilling et al. | |
| 2016/0179850 A1 * | 6/2016 | Martin | G06F 16/214 707/634 |
| 2017/0046143 A1 * | 2/2017 | Kochhar | G06F 16/214 |
| 2017/0235559 A1 * | 8/2017 | Saenz | G06F 8/65 717/171 |

OTHER PUBLICATIONS

IBM. IBM WebSphere Application Server Migration Toolkit. 2016, <available at https://www-01.ibm.com/support/docview.wss?uid=swg27008724&aid=11> (Year: 2016).*

* cited by examiner

AUTOMATED SERVER ANALYSIS AND PATCHING FOR ENABLING RELATIONAL DATABASE MIGRATION TO A CLOUD NETWORK

BACKGROUND

In order for a traditional database to be migrated to a new server environment for either full or partial implementation on a cloud server, the traditional database must be made compatible with the new server environment as the two environments may use different architectures, wherein some elements supported by the source environment may not be supported by the target cloud server environment. While databases may be made compatible through patching, current systems do not provide efficient patching of servers for minimizing server downtime.

BRIEF SUMMARY

Embodiments of the present invention address these and/or other needs by providing an innovative system directed to providing a server administration tool for migration of a relational database to a cloud server environment. The server administration tool includes a database migration tool a server patching tool to monitor and maintain a server system. The database migration tool allows for the migration and upload of a database stored on a source server to a target cloud server. The migrated database may be directly uploaded to the target server or hosted on a virtual machine. The server patching tool allows for patching of an initially incompatible source server enabling migration of a stored database to a new target server. The tool analyzes a database stored on a source server for compatibility with a new, target cloud server to determine whether an implemented patch would succeed or fail. In this way, errors reported by the tool, may be rectified without requiring costly, additional server downtime.

Embodiments of the invention relate to a system for providing a server administration tool for patching a relational database enabling migration of the relational database to a cloud server environment, the system comprising: at least one memory device; at least one network communication interface connected to a network; and at least one processing device operatively coupled to the memory device and the network communication interface, wherein the processing device is configured to execute computer-readable program code to: launch a server patching tool on a user device associated with a user; generate and present a server list to the user, wherein the server list comprises servers associated with a source server system, and wherein the servers further comprise one or more databases; prompt the user to select at least one database stored on a source server for migration, wherein the source server is associated with the source server system; analyze the source server for potential patching errors, wherein the potential patching errors prevent a patch from successfully being applied to the source server; determine that the server has at least one patching error, wherein the at least one patching error comprises one or more missing installation files, wherein the one or more installation files are required for successfully installing the patch; locate, automatically, the one or more missing installation files; in response to locating the one or more missing installation files, trigger an import of the one or more missing installation files to a system folder stored on the source server; in response to triggering an import of the one or more missing installation files, patch the source server thereby enabling migration and upload of the at least one database to a target server associated with a target server system; and upload the at least one database to the target server associated with the target server system.

In some embodiments of the invention, patching the server further comprises transmitting a command to one or more servers via a command line at a back-end of each of the one or more servers instructing the one or more servers to install the patch, wherein the patch is installed simultaneously, in parallel on the source server and the one or more servers.

In some embodiments, analyzing the source server for at least one potential patching error further comprises: analyzing the source server prior to an attempted patch; determining that the attempted patch will not be successful; preventing the attempted patch from initiating; and generating and presenting, to the user via the user device, a message, wherein the message notifies the user that the attempted patch will not be successful.

In some embodiments, launching the server patching tool further comprises installing and storing the server patching tool on the user device associated with the user.

In some embodiments, the potential patching errors further comprise server label issues, application issues, and compatibility issues with other operating systems.

In some embodiments, uploading the at least one database to the target server further comprises uploading the at least one database to a virtual machine installed on the target server system, wherein the virtual machine hosts the at least one database on the target server system.

In some embodiments, the target server system is a cloud server system.

In some embodiments, patching the source server allows the at least one database stored on the source server to be compatible with the target server and the successful migration and upload of the at least one database from the source server system to the target server system.

Other embodiments of the invention relate to a computer program product for providing a server administration tool for patching a relational database enabling migration of the relational database to a cloud server environment, the computer program product comprising at least one non-transitory computer readable medium having computer-readable program code portions embodied therein, the computer-readable program code portions comprising: an executable portion configured for launching a server patching tool on a user device associated with a user; an executable portion configured for generating and presenting a server list to the user, wherein the server list comprises servers associated with a source server system, and wherein the servers further comprise one or more databases; an executable portion configured for prompting the user to select at least one database stored on a source server for migration, wherein the source server is associated with the source server system; an executable portion configured for analyzing the source server for potential patching errors, wherein the potential patching errors prevent a patch from successfully being applied to the source server; an executable portion configured for determining that the server has at least one patching error, wherein the at least one patching error comprises one or more missing installation files, wherein the one or more installation files are required for successfully installing the patch; an executable portion configured for locating, automatically, the one or more missing installation files; an executable portion configured for, in response to locating the one or more missing installation files, triggering an import of the one or more missing installation files to a system folder stored on the source server; an executable portion configured for, in response to triggering an import of the one or more missing installation files, patching the source server thereby enabling migration and upload of the at least one database to a target server associated with a target server system; and an executable portion configured for uploading the at least one database to the target server associated with the target server system.

In some embodiments of the invention, patching the server further comprises transmitting a command to one or more servers via a command line at a back-end of each of the one or more servers instructing the one or more servers to install the patch, wherein the patch is installed simultaneously, in parallel on the source server and the one or more servers.

In some embodiments, analyzing the source server for at least one potential patching error further comprises: analyzing the source server prior to an attempted patch; determining that the attempted patch will not be successful; preventing the attempted patch from initiating; and generating and presenting, to the user via the user device, a message, wherein the message notifies the user that the attempted patch will not be successful.

In some embodiments, launching the server patching tool further comprises installing and storing the server patching tool on the user device associated with the user.

In some embodiments, the potential patching errors further comprise server label issues, application issues, and compatibility issues with other operating systems.

In some embodiments, uploading the at least one database to the target server further comprises uploading the at least one database to a virtual machine installed on the target server system, wherein the virtual machine hosts the at least one database on the target server system.

In some embodiments, the target server system is a cloud server system.

In some embodiments, patching the source server allows the at least one database stored on the source server to be compatible with the target server and the successful migration and upload of the at least one database from the source server system to the target server system.

Other embodiments of the invention relate to a computer implemented method for providing a server administration tool for patching a relational database enabling migration of the relational database to a cloud server environment, the computer implemented method comprising: launching a server patching tool on a user device associated with a user; generating and presenting a server list to the user, wherein the server list comprises servers associated with a source server system, and wherein the servers further comprise one or more databases; prompting the user to select at least one database stored on a source server for migration, wherein the source server is associated with the source server system; analyzing the source server for potential patching errors, wherein the potential patching errors prevent a patch from successfully being applied to the source server; determining that the server has at least one patching error, wherein the at least one patching error comprises one or more missing installation files, wherein the one or more installation files are required for successfully installing the patch; locating, automatically, the one or more missing installation files; in response to locating the one or more missing installation files, triggering an import of the one or more missing installation files to a system folder stored on the source server; in response to triggering an import of the one or more missing installation files, patching the source server thereby enabling migration and upload of the at least one database to a target server associated with a target server system; and uploading the at least one database to the target server associated with the target server system.

In some embodiments, patching the server further comprises transmitting a command to one or more servers via a command line at a back-end of each of the one or more servers instructing the one or more servers to install the patch, wherein the patch is installed simultaneously, in parallel on the source server and the one or more servers.

In some embodiments, analyzing the source server for at least one potential patching error further comprises: analyzing the source server prior to an attempted patch; determining that the attempted patch will not be successful; preventing the attempted patch from initiating; and generating and presenting, to the user via the user device, a message, wherein the message notifies the user that the attempted patch will not be successful.

In some embodiments, launching the server patching tool further comprises installing and storing the server patching tool on the user device associated with the user.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
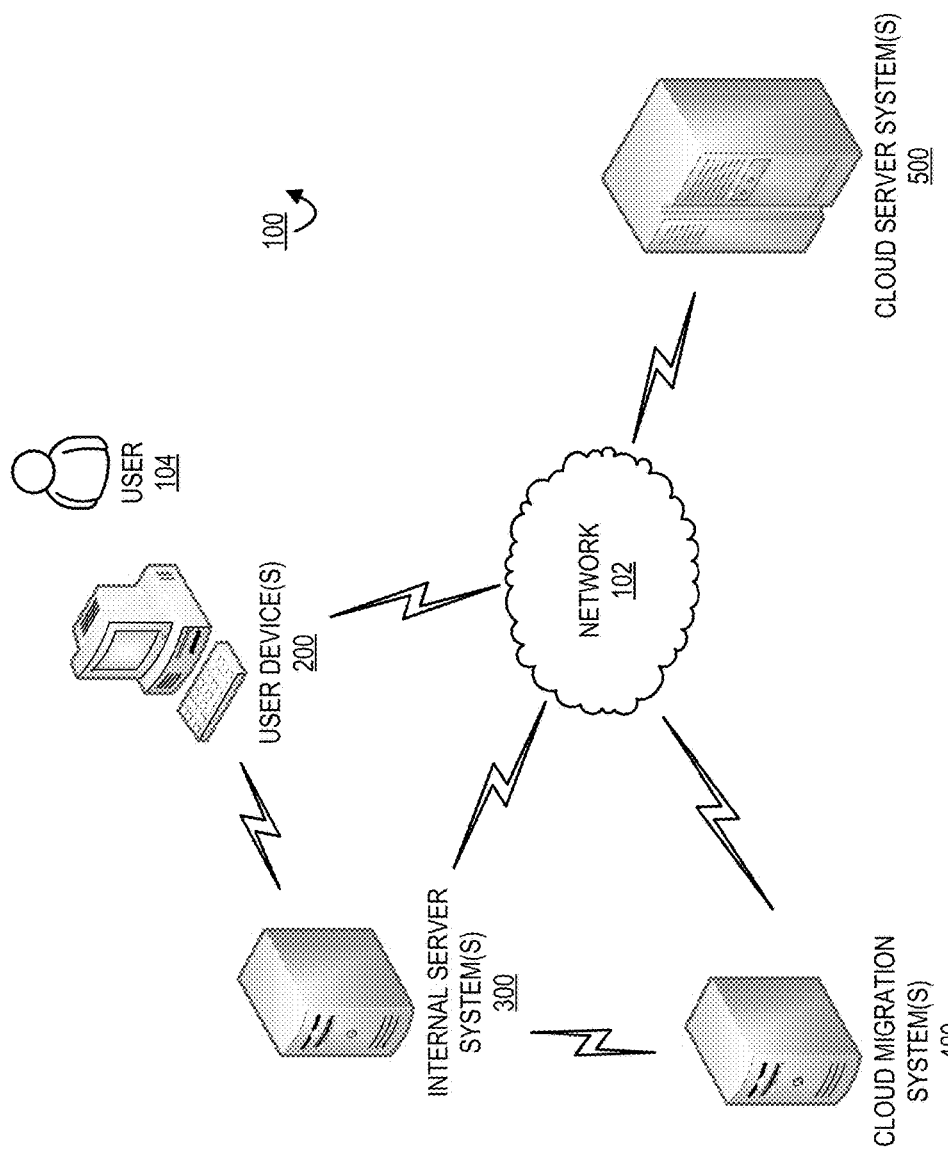
Figure 2:
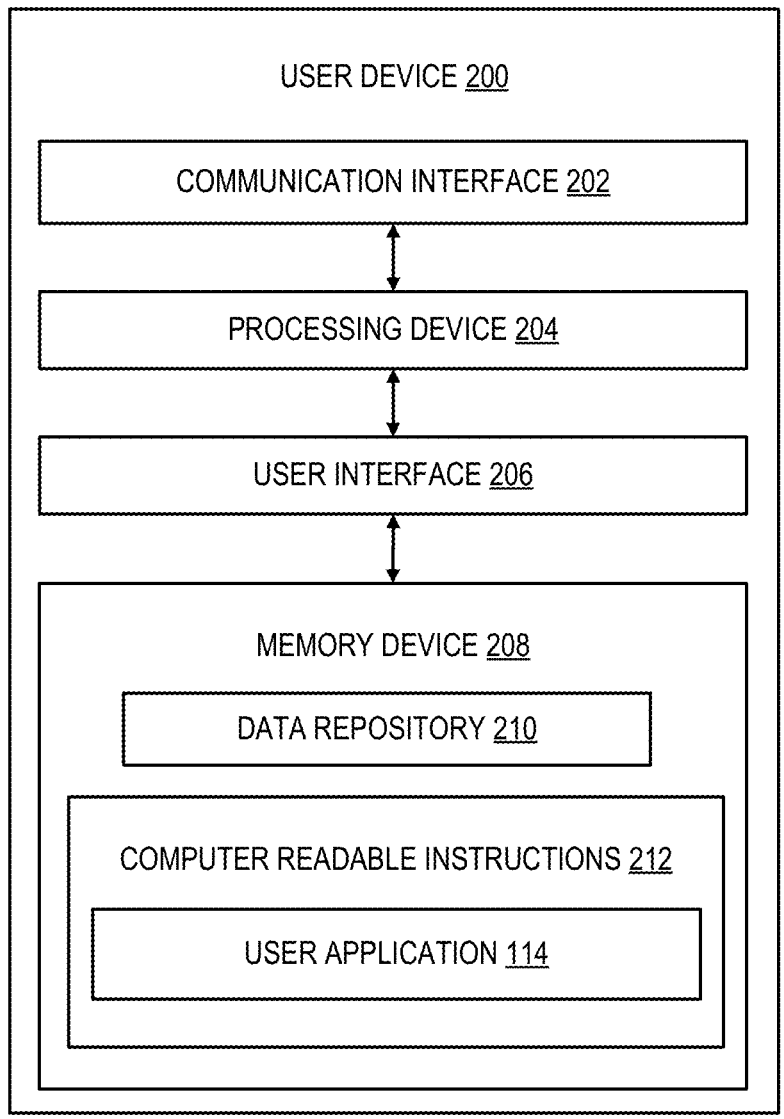
Figure 3:
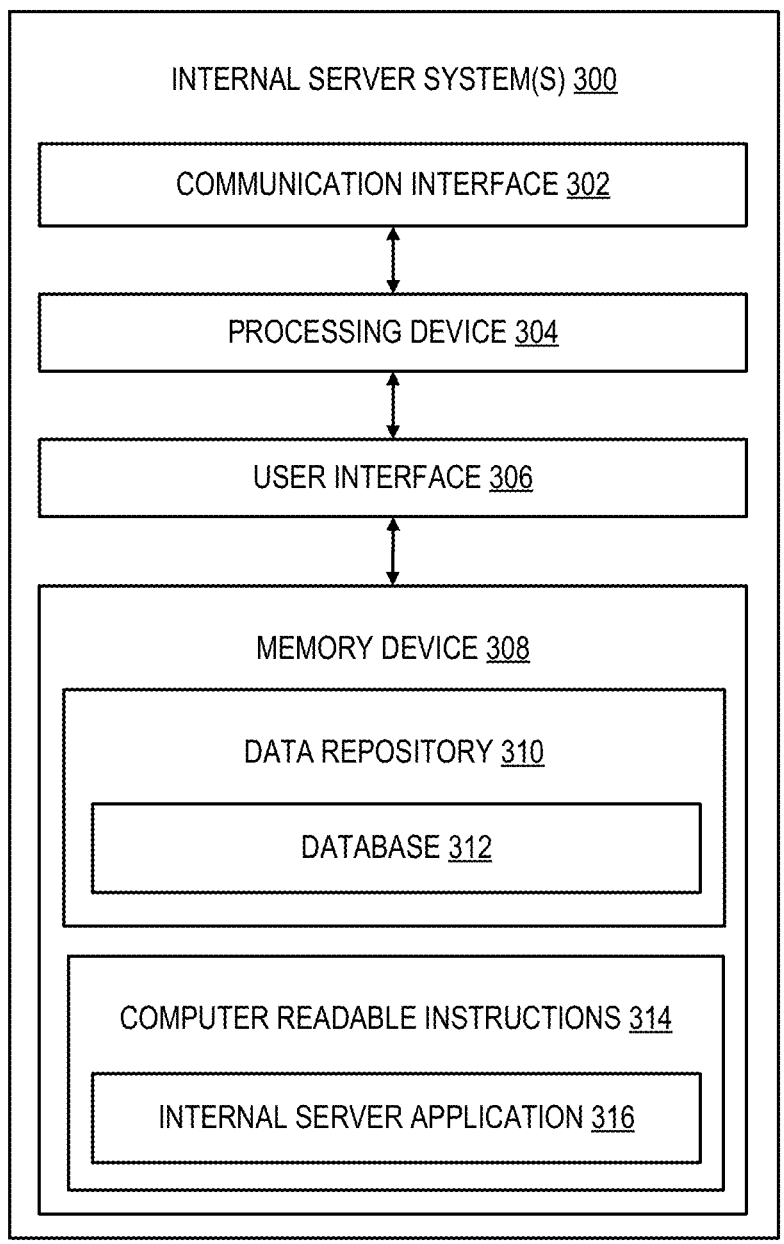
Figure 4:
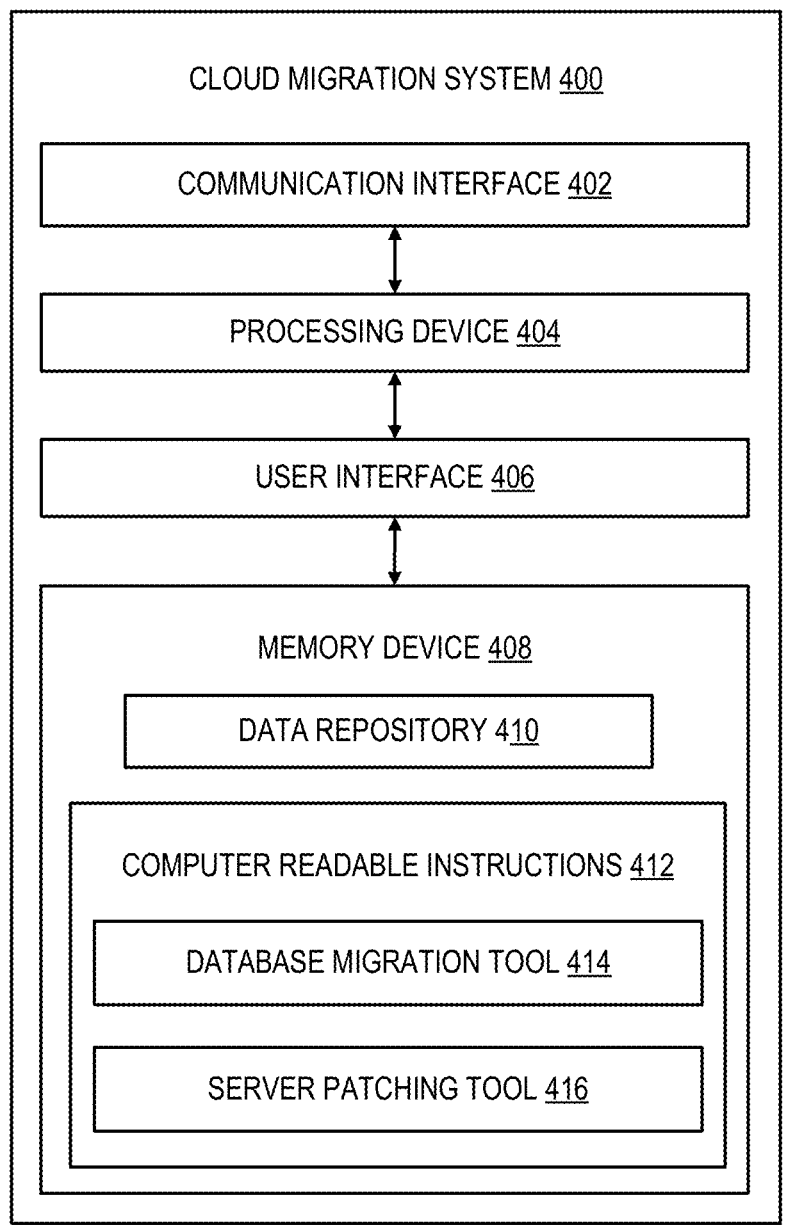
Figure 5:
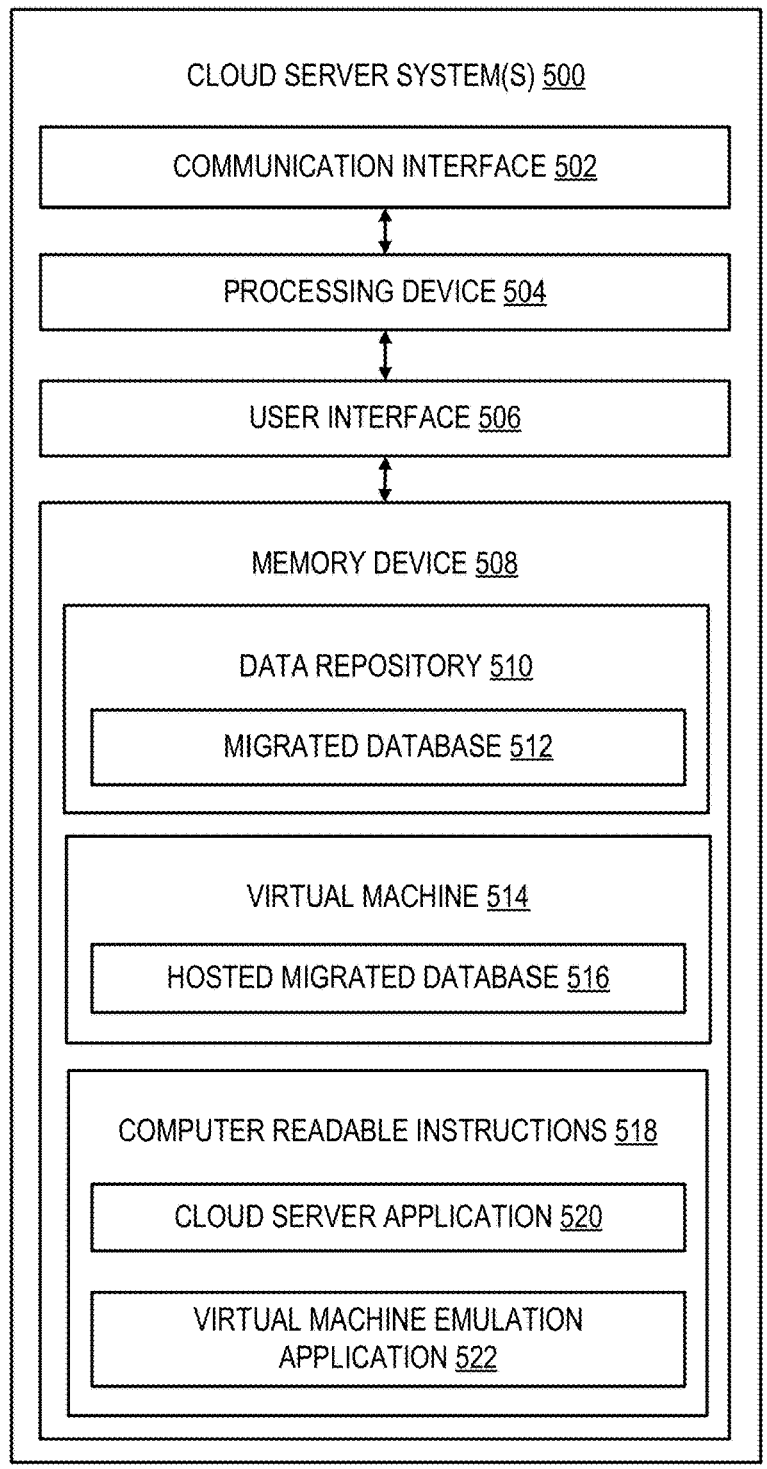
Figure 6:
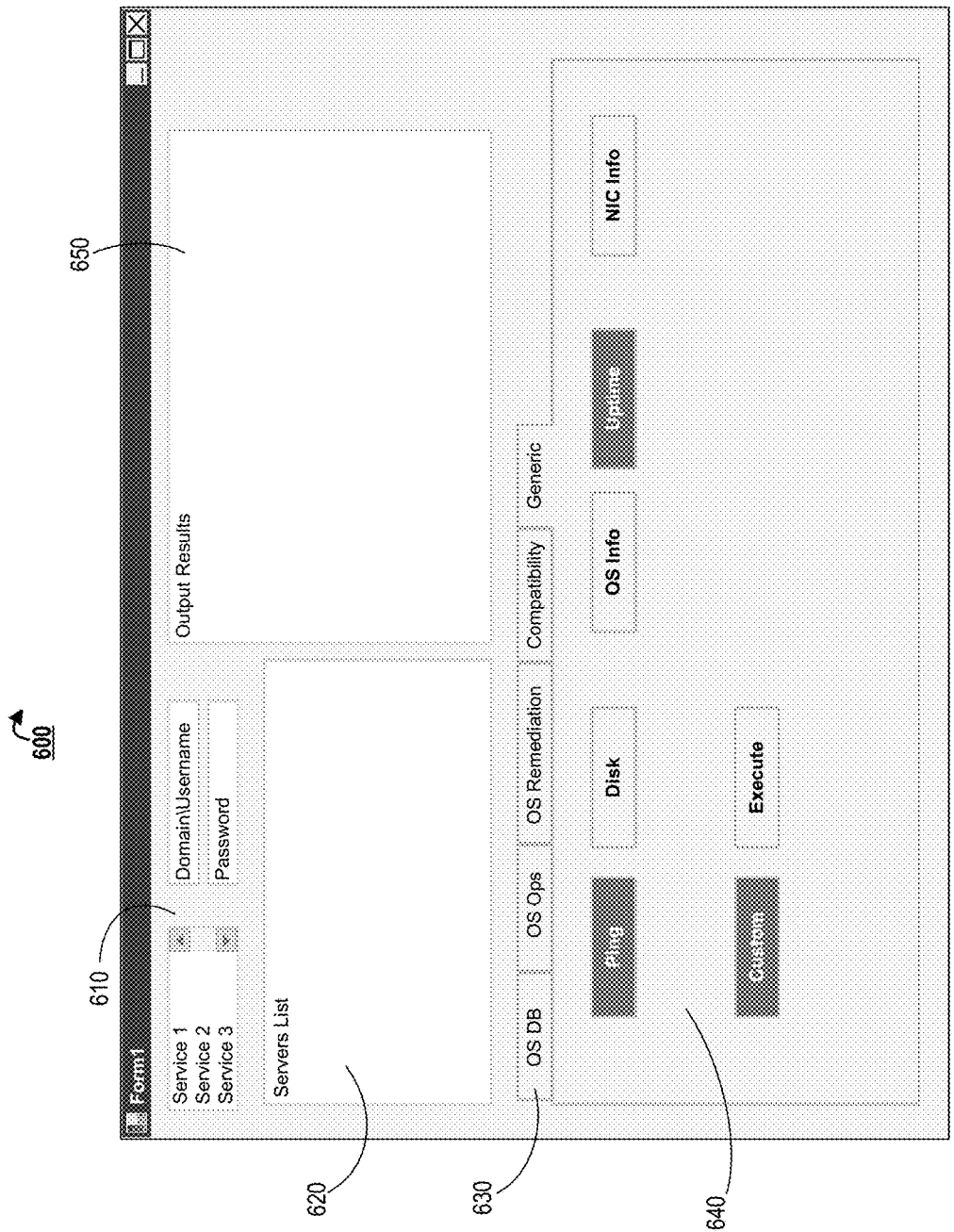
Figure 7:
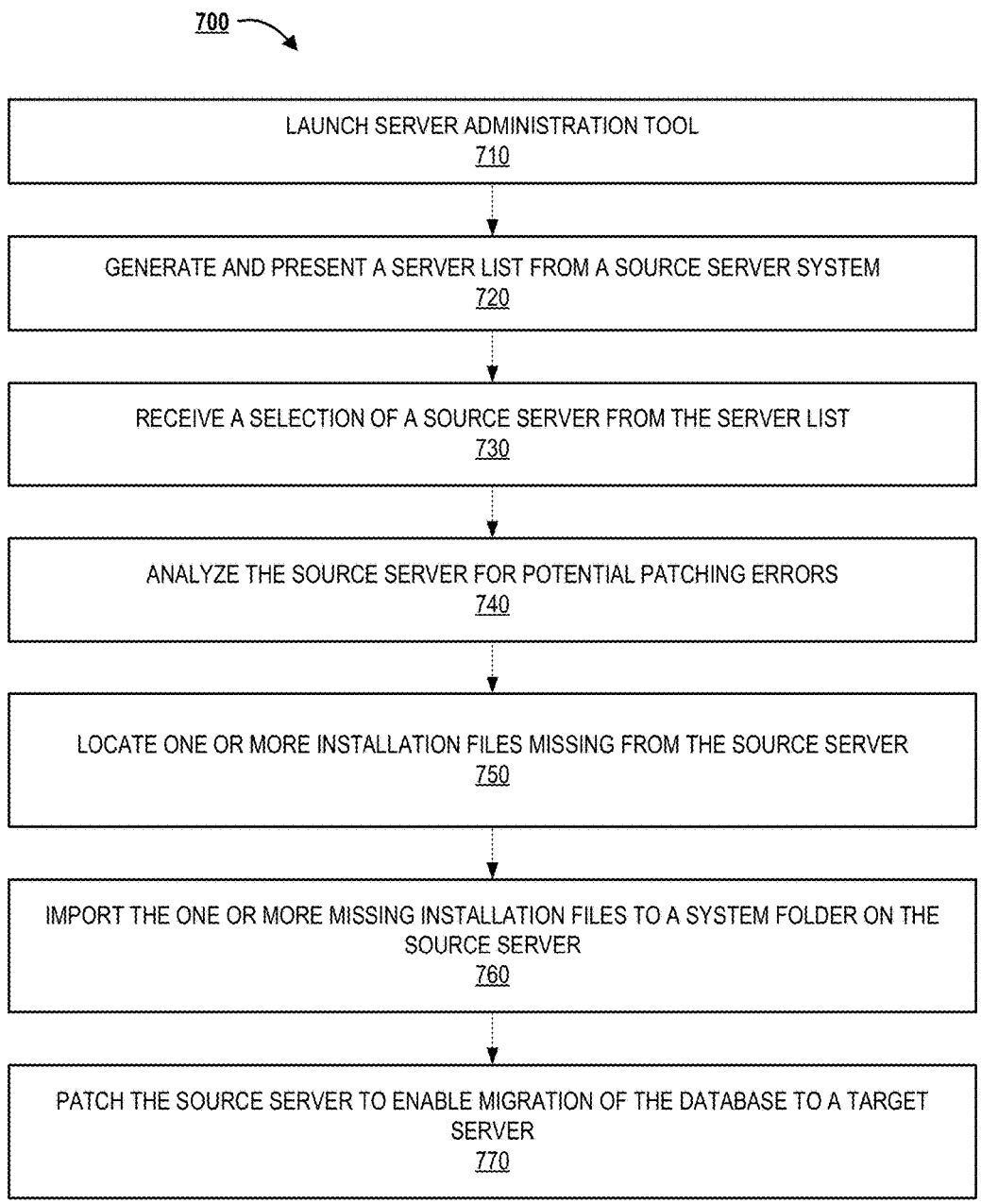
Figure 8:
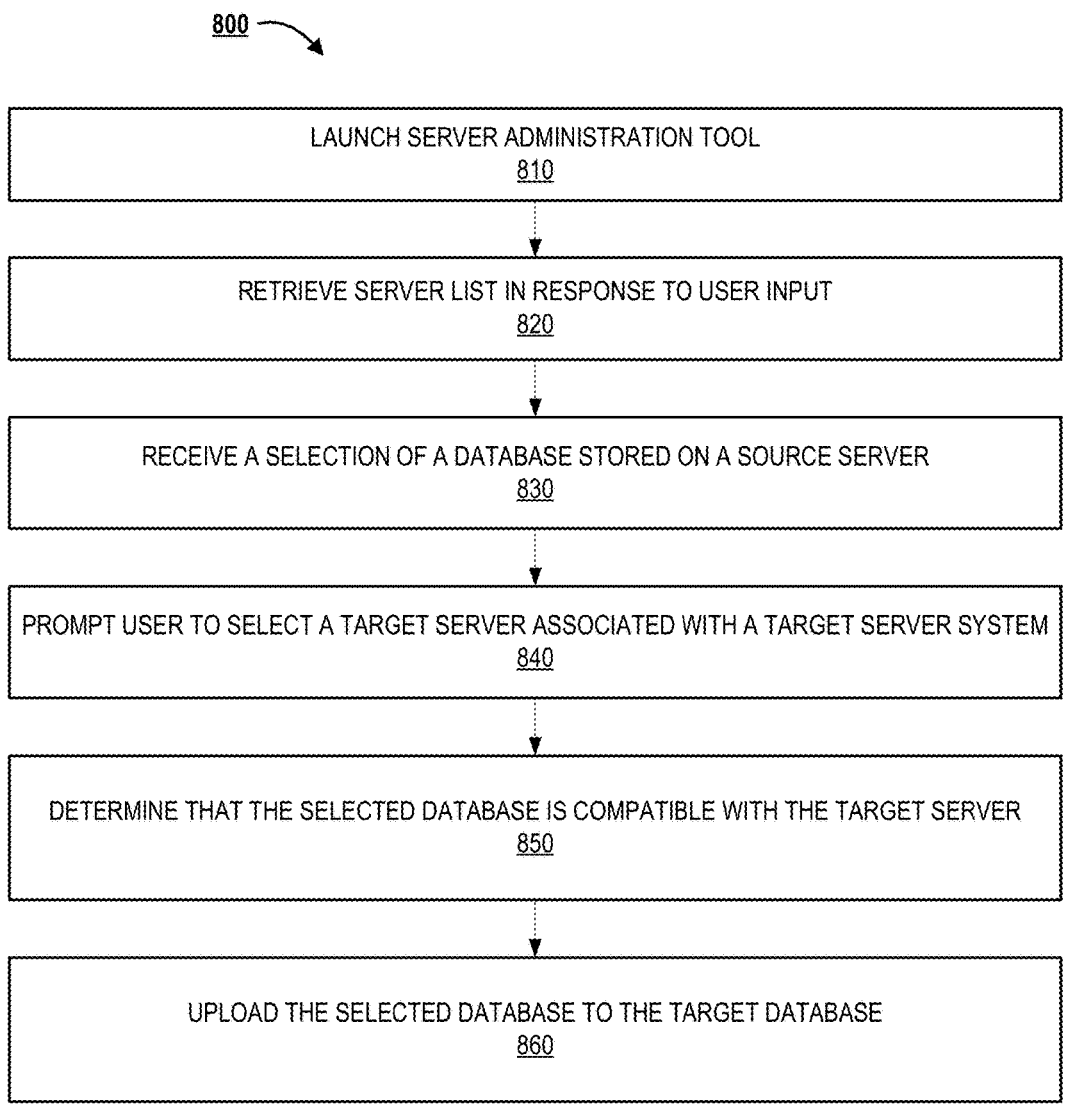
Figure 9:
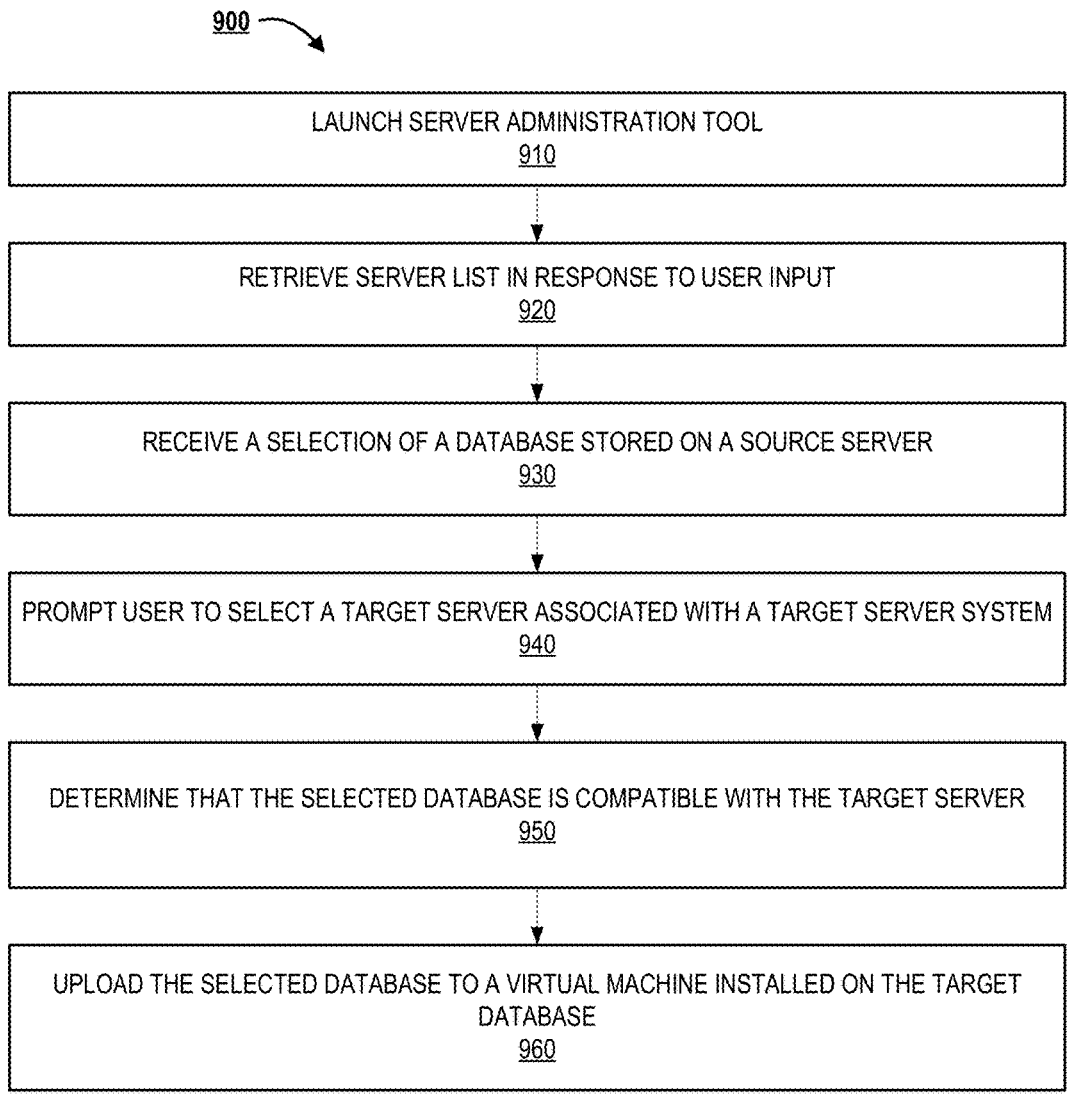

Having thus described embodiments of the invention in general terms, reference will now be made the accompanying drawings, wherein:

FIG. 1 illustrates a cloud migration system environment, in accordance with some embodiments of the invention;

FIG. 2 schematically depicts a user device, in accordance with some embodiments of the invention;

FIG. 3 schematically depicts an internal server system, in accordance with some embodiments of the invention;

FIG. 4 schematically depicts a cloud migration system, in accordance with some embodiments of the invention;

FIG. 5 schematically depicts a cloud server system, in accordance with some embodiments of the invention;

FIG. 6 provides a graphical representation of a portion of a server administration tool user interface, in accordance with some embodiments of the invention;

FIG. 7 provides a high level process flow for patching a sever to enable database migration, in accordance with some embodiments of the invention;

FIG. 8 provides a high level process flow for migrating a database to a target server, in accordance with some embodiments of the invention; and FIG. 9 provides a high level process flow for migrating a database to a virtual machine hosted on a target server, in accordance with some embodiments of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

"Authentication information" is any information that can be used to identify of a user. For example, a system may prompt a user to enter authentication information such as a username, a password, a personal identification number (PIN), a passcode, biometric information (e.g., voice authentication, a fingerprint, and/or a retina scan), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. An "entity" as used herein may be a financial institution.

To "monitor" is to watch, observe, or check something for a special purpose over a period of time. The "monitoring" may occur periodically over the period of time, or the monitoring may occur continuously over the period of time. In some embodiments, a system may actively monitor a database, wherein the system reaches out to the database and watches, observes, or checks the database for changes, updates, and the like. In other embodiments, a system may passively monitor a database, wherein the database provides information to the system and the system then watches, observes, or checks the provided information. To "maintain" or to provide "maintenance" is to manage, update, or retain something. In some embodiments "maintaining" may include housing or storing a database or server on hardware and/or software associated with a maintaining entity. In some embodiments, "maintaining" may further comprise applying software updates or applying patches to a server or database.

A "database" may be a collection of stored data, a data repository, an application, software, or the like. In some embodiments a database is a relational database. A "user" may be an operator of a server administration tool (e.g., a server administrator, database administrator, technician, analyst, software developer or the like). Furthermore, as used herein the term "user device" may refer to any device that employs a processor and memory and can perform computing functions, such as a personal computer or a mobile device, wherein a mobile device is any mobile communication device, such as a cellular telecommunications device (i.e., a cell phone or mobile phone), personal digital assistant (PDA), a mobile Internet accessing device, or other mobile device. Other types of mobile devices may include portable digital assistants (PDAs), pagers, wearable devices, mobile televisions, gaming devices, laptop computers, cameras, video recorders, audio/video player, radio, global positioning system (GPS) devices, or any combination of the aforementioned. In accordance with embodiments of the invention, the term "entity" includes any organization that maintains, operates, and/or stores information or data on one or more databases, servers, and/or server systems. In some embodiments, a "user" and "entity" may refer to the same person.

The present invention relates to a system, method, and computer program product for providing a server administration tool for migration of a relational database to a cloud server environment. In order for a traditional database to be migrated to a new environment for either full or partial implementation on a cloud server, the traditional database must be made compatible with the new environment as the two environments may use different architectures, wherein some elements supported by the source environment may not be supported by the target cloud server environment. Common errors and constraints that may present themselves as a result of this potential migration include, for example, server label issues, application issues, and compatibility issues which further include compatibility issues with older operating systems. These errors would normally be fixed through patching or updating the servers to make the databases stored on the servers compatible with the new environment which may be using a different database management system than the source server.

In some instances, a large corporation or business may maintain thousands of servers which may be relied upon internally by the business itself or externally by customers for various applications. Due to this dependence, businesses wish to minimize any form of server downtime including downtime for patching, wherein the servers are made unavailable to perform their intended functions so that various updates may be applied. As a result, there exists a limited amount of designated time for applying patches. Furthermore, those large corporations and businesses that need to patch several thousand servers must possess and employ a significant number of resources in order to update an entire system and minimize downtime.

In some embodiments, the invention allows a user to migrate a relational database or other data storage to a cloud server environment. A cloud migration tool provides a user with a centralized interface for efficiently migrating a traditional database to a new cloud environment. The cloud migration tool facilitates the migration of a traditional database to a cloud environment under both an infrastructure-as-a-service (IaaS) model as well as a platform-as-a-service (PaaS, also known as database-as-a-service (DBaaS)) model. Depending on the user's project objectives and available resources, the user may decide to either migrate a database directly to a cloud server, wherein the database is stored and maintained by the cloud provider (PaaS), or the user may decide to install the database onto a virtual machine within the cloud server, wherein the user may retain responsibility for the maintenance of the database while avoiding some compatibility issues as the virtual machine emulates the source server system architecture (IaaS).

PaaS may be preferable to a user who may not already possess the information technology (IT) or development resources necessary to develop a system from the ground up. For those without experience, PaaS may seem attractive as the external cloud service provider is generally responsible for managing, patching, and maintaining the server. In this way, platform-as-a-service offers less risk and cost than an in-house database project. Additionally, as developing server infrastructure can be a time-consuming task, PaaS offers an already established system allowing for rapid application deployment within a short time frame for users who might need to get a product to market as soon as possible. IaaS, however, allows users to create and manage their own virtual machine to host a database within the cloud server environment. This model allows the user to retain the autonomy to run and install his/her own applications and retain more control over the management, patching, and maintenance of the server. The ability to host a traditional database on a virtual machine installed within the cloud server environment allows for the user to avoid some compatibility issues and the application size limitations experienced in a PaaS model. IaaS may be preferable for a user who already has the resources available to maintain the virtual machine or wishes to be more hands-on in tailoring the specific details of the hosted system. The cloud migration administration tool provides a single tool for uploading a database onto the cloud and facilitates implementation of either of the above-described models while ensuring compatibility of the database with the new environment and minimizing maintenance downtime. Furthermore, due to its collection and simplified presentation of several server maintenance functionalities in a single location, the server administration tool allows for easy and efficient execution of normally complex or complicated, multi-step tasks to be performed by server administrators, database administrators, or any user or operator of the server administration tool thereby improving the processes of server maintenance and database migration.

In some embodiments, the invention further comprises a cloud migration patching tool for relational databases ensuring environment compatibility with a cloud server through properly implemented patching. The tool possesses the capability to analyze a database stored on a source server for compatibility with a new, target cloud server environment and to determine whether an implemented patch would succeed or fail. In this way, issues or errors reported by the system, such as missing installation packages, may be rectified without requiring costly, additional server downtime. The tool automatically locates and imports the required installation files to the server system folder to allow it to be made compatible, before notifying the user that the server may now be migrated. Previously, there was no tool available to server administrators (SAs) or database administrators (DBAs) permitting this functionality and missing installation packages required the server to be rebuilt before an upgrade to the cloud server environment could be carried out.

Furthermore, the patching tool allows for a list of several servers or nodes to be patched or updated in parallel by transmitting commands to each of the listed servers via the command line at the back-end of each system, thereby reducing the amount of time required to patch or update multiple servers. This improves the efficiency of server patching by reducing the resources required, such as time, manpower, or system memory and processing ability, to implement one or more patches. Additionally, by reducing the time required for the server patching process, the amount of server downtime is reduced thereby improving the experience of a customer, client, employee, or the like who may require access to the server. Once patched and determined compatible, databases may be uploaded to the new cloud environment.

Referring to FIG. 1, the figure illustrates a cloud migration system environment 100, in accordance with some embodiments of the invention. The environment 100 includes a user device 200 associated or used with authorization of a user 104, an internal server system 300, a cloud migration system 400, and a cloud server system 500. As used herein, a "processing device," such as the processing devices 204, 304, 404, and 504, generally refers to a device or combination of devices having circuitry used for implementing the communication and/or logic functions of a particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may further include functionality to operate one or more software programs based on computer-executable program code thereof, which may be stored in a memory. As the phrase is used herein, a processing device may be "configured to" perform a certain function in a variety of ways, including, for example, by having one or more general-purpose circuits perform the function by executing particular computer-executable program code embodied in computer-readable medium, and/or by having one or more application-specific circuits perform the function.

As used herein, a "user interface," such as the user interfaces 206, 306, 406, and 506, generally includes a plurality of interface devices and/or software that allow a customer to input commands and data to direct the processing device to execute instructions. For example, the user interface presented in FIG. 2 may include a graphical user interface (GUI) or an interface to input computer-executable instructions that direct the processing device to carry out specific functions. The user interface employs certain input and output devices to input data received from a user or output data to a user. These input and output devices may include a display, mouse, keyboard, button, touchpad, touch screen, microphone, speaker, LED, light, joystick, switch, buzzer, bell, and/or other customer input/output device for communicating with one or more customers.

As used herein, a "memory device," such as memory devices 208, 308, 408, and 508, generally refers to a device or combination of devices that store one or more forms of computer-readable media for storing data and/or computer-executable program code/instructions. Computer-readable media is defined in greater detail below. For example, in one embodiment, the memory device includes any computer memory that provides an actual or virtual space to temporarily or permanently store data and/or commands provided to the processing device when it carries out its functions described herein.

As used herein, a "communication interface," such as communication interfaces 202, 302, 402, and 502, generally includes a modem, server, transceiver, and/or other device for communicating with other devices on a network, and/or a user interface for communicating with one or more customers. A communication interface may have one or more communication devices configured to communicate with one or more other devices on a network, such as a user device, computer system, server system, cloud server system, and/or the like. The processing device is configured to use the network communication interface to transmit and/or receive data and/or commands to and/or from the other devices connected to the network.

The systems and devices communicate with one another over the network 102 and perform one or more of the various steps and/or methods according to embodiments of the disclosure discussed herein. The network 102 may include a local area network (LAN), a wide area network (WAN), and/or a global area network (GAN). The network 102 may provide for wireline, wireless, or a combination of wireline and wireless communication between devices in the network. In one embodiment, the network 102 includes the Internet.

Referring now to FIG. 2, which schematically depicts a user device, in accordance with one embodiment of the invention, the user device 200 includes a communication interface 202 communicably coupled with a processing device 204, which is also communicably coupled with a memory device 208. In some embodiments, the communication interface 202 may also comprise a GPS transceiver capable of determining a geographic location associated with the user device 200. The processing device 204 is configured to control the communication interface 202 such that the user device 200 communicates across the network 102 with one or more other systems. The processing device 204 is also configured to access the memory device 208 in order to read the computer readable instructions 212, which in some embodiments includes a user application 114. The user application 114 allows for communication of the user device 200 with the other systems and devices within the environment 100 such as the internal server system 300, the cloud migration system 400, and the cloud server system 500. The user application 114 allows the user 104 to receive information transmitted as well as input information requested by the other systems and communicate with entities and third parties within the system environment 100. The memory device 208 also includes a data repository 210 or similar storage device for storing pieces of data that can be accessed by the processing device 706.

Referring now to FIG. 3, which schematically depicts an internal server system, in accordance with one embodiment of the invention, the internal server system 300 includes a communication interface 302 communicably coupled with a processing device 304, which is also communicably coupled with a memory device 308. The processing device 304 is configured to control the communication interface 302 such that the internal server system 300 communicates across the network 102 with one or more other systems. The processing device 304 is also configured to access the memory device 308 in order to read the computer readable instructions 314, which in some embodiments includes an internal server application 316. The internal server application 316 allows for the maintenance of one or more servers and data stored on the servers of the internal server system. The internal server application 316 may also allow for communication with the other systems and devices within the environment 100 such as the user device 200, the cloud migration system 400, and cloud server system 500. The memory device 308 also includes a data repository 310 or similar storage device for storing pieces of data that can be accessed by the processing device 304 such as a database 312 maintained by the internal server system. In some embodiments, the internal server system is maintained in-house by a source entity.

Referring now to FIG. 4, which schematically depicts a cloud migration system, in accordance with one embodiment of the invention, the cloud migration system 400 includes a processing device 404 operatively coupled to a communication interface 402 and a memory device 408. The processing device 404 is configured to control the communication interface 402 such that the cloud migration system 400 communicates across the network 102 with one or more other systems. The processing device 404 is also configured to access the memory device 408 in order to read the computer readable instructions 412, which in some embodiments include a database migration tool 414 and a server patching tool 416. The database migration tool 414 allows for the migration of a database stored on a server of the internal server system 300 to a target server stored on a cloud server system 500, while the server patching tool 416 allows for patching of a server stored on the internal server system 300 enabling migration of a database. In some embodiments, either the database migration tool 414 and/or the server patching tool 416 may also allow for communication with the other systems and devices within the environment 100 such as the user device 200, the internal server system 300, and cloud server system 500. The memory device 408 also includes a data repository 410 or similar storage device for storing pieces of data that can be accessed by the processing device 304. In some embodiments, the cloud migration system 400 may be part of another system in the environment 100 such as the user device 200, the internal server system 300, and/or the cloud server system 500.

Referring now to FIG. 5, which schematically depicts a cloud server system, in accordance with one embodiment of the invention, the cloud server system 500 includes a communication interface 502 communicably coupled with a processing device 504, which is also communicably coupled with a memory device 508. The processing device 504 is configured to control the communication interface 502 such that the cloud server system 500 communicates across the network 102 with one or more other systems. The processing device 504 is also configured to access the memory device 508 in order to read the computer readable instructions 518, which in some embodiments includes a cloud server application 520 and a virtual machine emulation application 522. The cloud server application 518 allows for the maintenance of one or more servers and data stored on the servers of the cloud server system 500, while the virtual machine emulation application 522 allows for system architecture associated with a source server stored on the internal server system 300 to be emulated on a virtual machine 514 installed on the cloud server system 500. The cloud server application 518 may also allow for communication with the other systems and devices within the environment 100 such as the user device 200, the internal server system 300, and the cloud migration system 400. The memory device 508 also includes a data repository 510 or similar storage device for storing pieces of data that can be accessed by the processing device 304 such as a migrated database 512 which may have been uploaded directly to a target server associated with the cloud server system 500. The cloud server system 500 may further comprise the virtual machine 514 which may be configured to host a hosted migrated database 516. In some embodiments, the cloud server system is maintained by a third party entity.

The user application 114, the internal server application 316, the database migration tool 414, the server patching tool 416, the cloud server application 520, and the virtual machine emulation application 522 are for instructing the processing devices on their respective systems to perform various steps of the methods discussed herein, and/or other steps and/or similar steps. In various embodiments, one or more of the various applications discussed are included in the computer readable instructions stored in a memory device of one or more systems or devices other than their respective systems and/or devices. For example, in some embodiments, the database migration tool 414 may be stored and configured for being accessed by a processing device of the internal server system 300 connected to the network 102. In various embodiments, the user application 114, the internal server application 316, the database migration tool 414, the server patching tool 416, the cloud server application 520, and the virtual machine emulation application 522 are stored and executed by different systems/devices. In some embodiments, the discussed applications may be similar and may be configured to communicate with one another. In some embodiments, the various applications may be considered to be working together as a singular application despite being stored and executed on different systems.

In various embodiments, one of the systems discussed above, such as the cloud server system 500, is more than one system and the various components of the system are not collocated, and in various embodiments, there are multiple components performing the functions indicated herein as a single device. For example, in one embodiment, multiple processing devices perform the functions of the processing device 504 of the cloud server system 500 described herein.

In various embodiments, the user device 200, the internal server system 300, the cloud migration system 400, the cloud server system 500 and/or other systems may perform all or part of a one or more method or process steps discussed above and/or other method steps in association with the method steps discussed above. Furthermore, some or all the systems/devices discussed herein, in association with other systems or without association with other systems, in association with steps being performed manually or without steps being performed manually, may perform one or more of the steps of one or more of the method discussed herein, or other methods, processes or steps discussed herein or not discussed herein.

Referring now to FIG. 7 which provides a high level process flow for patching a sever to enable database migration 700, in accordance with one embodiment of the invention, the process 700 begins with a server administration tool being launched as seen in block 710. In various embodiments of the invention, the server administration tool may further comprise a database migration tool, a server patching tool and/or other functionalities used to monitor and maintain one or more systems or servers in a system environment as previously discussed in FIG. 1. In some embodiments, the database migration tool allows for the migration and upload of a database stored on a server of a source server system to a target server stored on a target server system, while the server patching tool allows for patching of a server stored on a source server system enabling migration of a database stored on the patched server.

In some embodiments, the server administration tool may be a software application stored and launched by a user from a user device, such as a computer, workstation, mobile device, or the like. In some embodiments, the data base administration tool may be stored and operated by a system other than the system used to launch and access the tool, wherein the tool is remotely operated over a network. In some embodiments, the server administration tool may launch upon a user either directly or remotely accessing the tool or application on a user device or other system in which the server administration tool is stored. In other embodiments the server administration tool may run passively in the background of one or more systems, wherein launching of the tool may be automatic in response to the system detecting that the user has initiated or requested initiation of one or more server administration tool functionalities. In still other embodiments, the system may install and store the server administration tool on the user device associated with the user in response to a request for access transmitted from the user.

As illustrated in block 720 of FIG. 7, the system generates and presents a server list from a source server system. The server list is a collection of servers and associated server information such as server identification, storage location, server contents, and the like that has been extracted and retrieved from the one or more servers comprising a source server system. The servers may be used to store or run one or more relational databases, applications, and/or the like. In some embodiments, the system presents the server list to a user allowing the user to view information contained within the server list and select one or more servers for the server administration tool to analyze or upon which to perform other operations associated with the server administration tool such as database migration. In some embodiments, the tool prompts the user to first select or provide one or more server search refinements prior to generating the server list in order to provide the user with a server list that is relevant to the user's requirements. Server search requirements may include server identification information such a server name, location, and/or contents. In some embodiments, the system allows the user to define one or more services, applications, databases, and/or other server contents which might be stored on one or more specific servers in order to refine the results of a generated server list.

The system may prompt the user with a notification, message, alert, or the like to select one or more servers from the server list for analysis and/or other tool operations. In some embodiments, the system may require the user to provide authentication information, such as a username, password, and the like, to access, analyze, and/or perform other operations on one or more servers displayed in the server list.

As illustrated in block 730 of FIG. 7, the system receives a selection of a source server from the server list. In some embodiments, the user selects one or more servers from the provided server list for analysis and/or patching. In some embodiments, the system prompts the user for a selection via a generated message or alert displayed on the user device. In other embodiments, the system may not require a user selection and, instead, may automatically analyze all servers prior to patching. In other embodiments, the system may select one or more servers for analysis based on the server information associated with the one or more servers such as server name, storage location, server contents, and/or system architecture associated with the one or more servers. In some embodiments, the system further receives a selection of a database stored on one or more servers from the server list.

As illustrated in block 740 of FIG. 7, the system analyzes the source server for potential patching errors based on the selected source server and the patch to be applied to the source server. Potential patching errors are errors present on a source server that might prevent a server patch from being successfully implemented. A patch is a piece of software that is installed on computer system in order to update, fix, or improve an application or function associated with the computer system. In some embodiments, a patch may comprise the installation of hardware onto a server system. In some embodiments, the patch updates a source server to enable the successful migration of a database stored on the source server to a new, target server associated with a target server system, wherein the target server may have system architecture different than that of the source server, wherein the database is initially not compatible with the target server prior to patching. In some embodiments, patching errors comprise missing installation files, such as MSI or MSP files, issues with incompatible server labels, issues with application compatibility, and compatibility issues with older operating systems, wherein newer commands may not be found or recognized in the older operating systems.

In some embodiments, based on determining at least one potential patching error, the system prevents a patch from being applied to the source server. In some embodiments, the system prevents the patch from initiating or from being applied by temporarily blocking access of a user device to at least some commands on the source system such as a command to apply the patch. In other embodiments, in response to detecting at least one potential patching error, the system may prevent a patch from being applied by the user and/or system until the potential patching error is rectified by the user and/or system. In some embodiments, the system may allow the user to override any prevented access and apply the patch without first addressing the detected potential patching error. In some embodiments, the system may generate a message or alert to be displayed to the user, wherein the message or alert displays the detected potential patching error. In some embodiments, the system may generate a notification to be presented to the user notifying the user that an attempted patch will not be successful based on the analysis.

As illustrated in block 750 of FIG. 7, upon determining that one or more installation files are missing based on the prior analysis, the system automatically locates the one or more installation files missing from the source server. In some embodiments, the missing installation files may be retrieved from a source internal to the system such as a data repository, wherein backup installation files are stored. In other embodiments, the missing installation files may be located and retrieved from a source external to the system such as an external or third party data repository. In some embodiments, the system may locate and retrieve missing installation files from the internet. In yet other embodiments, the system may request that the user provide missing installation files from an external source such as an external hard drive, installation disc, flash drive, or the like.

As illustrated in block 760 of FIG. 7, in response to locating the one or more missing installation files, the system triggers an import of the one or more missing installation files to a system folder stored on the source server. In this way, the missing installation files are replaced in the appropriate system folder thereby eliminating the previously detected potential patching error. In some embodiments of the invention, upon determining that any previously detected potential patching errors have been eliminated, the system may restore user access to previously blocked commands on the user device for applying the patch. In some embodiments, the system may generate a message or alert and display the message or alert to the user via the user device in response to eliminating previously detected potential patching errors. In some embodiments, upon determining that the previously detected potential patching errors having been eliminated, the system may analyze the source server for any additional or newly created potential patching errors that may have been created as a result of eliminating the previously detected potential patching errors. Additional or newly created potential patching errors may be rectified by the system as discussed above.

As illustrated in block 770 of FIG. 7, in response to triggering an import of the one or more missing installation files, the system applies the patch to the source server. In this way, at least one database stored on the source server is made compatible with a target server and the system enables upload and migration of the at least one database to the target server on a target server system. In some embodiments, the system may simultaneously apply the patch to one or more additional servers or nodes. In some embodiments, the one or more additional servers may be patched or updated in parallel as a result of the system transmitting commands to each of the servers via the command line at the back-end of each system. In this way, the system reduces the amount of time required to patch or update multiple servers. Once patched and determined compatible by the system, databases stored on the source server or other servers on the source server system may be uploaded to one or more target servers on a target server system.

Referring now to FIG. 8 which provides a high level process flow for migrating a database to a target server 800, in accordance with one embodiment of the invention, the process 800 begins with a server administration tool being launched as seen in block 810. In various embodiments of the invention, the server administration tool may further comprise a database migration tool, a server patching tool and/or other functionalities used to monitor and maintain one or more systems or servers in a system environment as previously discussed in FIG. 1. In some embodiments, the database migration tool allows for the migration and upload of a database stored on a server of a source server system to a target server stored on a target server system, while the server patching tool allows for patching of a server stored on a source server system enabling migration of a database stored on the patched server.

In some embodiments, the server administration tool may be a software application stored and launched by a user from a user device, such as a computer, workstation, mobile device, or the like. In some embodiments, the data base administration tool may be stored and operated by a system other than the system used to launch and access the tool, wherein the tool is remotely operated over a network. In some embodiments, the server administration tool may launch upon a user either directly or remotely accessing the tool or application on a user device or other system in which the server administration tool is stored. In other embodiments the server administration tool may run passively in the background of one or more systems, wherein launching of the tool may be automatic in response to the system detecting that the user has initiated or requested initiation of one or more server administration tool functionalities.

As illustrated in block 820 of FIG. 8, the system generates and presents a server list from a source server system. The server list is a collection of servers and associated server information such as server identification, storage location, server contents, and the like that has been extracted and retrieved from the one or more servers comprising a source server system. The servers may be used to store or run one or more relational databases, applications, and/or the like. In some embodiments, the system presents the server list to a user allowing the user to view information contained within the server list and select one or more servers for the server administration tool to analyze or upon which to perform other operations associated with the server administration tool such as database migration. In some embodiments, the tool prompts the user to first select or provide one or more server search refinements prior to generating the server list in order to provide the user with a server list that is relevant to the user's requirements. Server search requirements may include server identification information such a server name, location, and/or contents. In some embodiments, the system allows the user to define one or more services, applications, databases, and/or other server contents which might be stored on one or more specific servers in order to refine the results of a generated server list.

The system may prompt the user with a notification, message, alert, or the like to select one or more servers from the server list for analysis and/or other tool operations. In some embodiments, the system may require the user to provide authentication information, such as a username, password, and the like, to access, analyze, and/or perform other operations on one or more servers displayed in the server list.

As illustrated in block 830 of FIG. 8, the system receive a selection of a source server from the server list and a selection of a database for migration stored on the source server. In some embodiments, the user selects one or more servers and or databases from the provided server list for analysis and/or migration. In some embodiments, the system prompts the user for a selection via a generated message or alert displayed on the user device. In other embodiments, the system may automatically analyze a server and or database prior to database migration. In other embodiments, the system may select one or more servers and/or databases for analysis based on the server information associated with the one or more servers such as server name, storage location, server contents, and/or system architecture associated with the one or more servers.

As illustrated in block 840 of FIG. 8, the system prompts the user to designate a target server stored on and associated with a target server system. The target server may be a server stored on the target server system which is designated as the destination of database selected for migration. In some embodiments, the system may automatically designate a previously determined default server on the target server system. In other embodiments, the system may automatically designate any available server on the target server system as the target server based on determining that the available server is compatible with the database being migrated. In some embodiments, one or more servers associated with the target server system may be designated as target servers.

In some embodiments of the invention the target server and the target server system may be a cloud server and a cloud server system respectively, wherein the cloud server is a virtual server. In some embodiments, the cloud server system may be a distributed cloud server network. In other embodiments, the target server may be a physical server within a physical server system. In some embodiments, the target server and/or the target server system may be maintained by a target entity. In some embodiments, the target entity may be a third-party entity that is different than a source entity associated with the source server system. In other embodiments, the target entity and the source entity may be the same.

The process continues as illustrated in block 850 of FIG. 8, wherein the system determines that the database stored on the source server is compatible with the target server. In some embodiments, the database and/or source server not being compatible with the target server and/or target server system may prevent the successful migration of the database to the target server, wherein the database may not function properly on the target server. A lack of compatibility of a migrated database stored on a source server with a target server may be at least partially a result of a difference or incompatibility of system architectures, operating systems, database management systems, and/or the like between the source server and the target server. In some embodiments of the invention, the system may allow for patching of servers in order to enable successful database migration from the source server to the target server as described in detail above. In some embodiments, in response to determining an incompatibility between the source and target servers, the system may automatically patch the source server and/or the database in order to rectify an incompatible with the target server and enable migration.

Finally, as illustrated in block 860 of FIG. 8, based on determining that the database is compatible with the target server, the system automatically uploads and migrates the database to the target server associated with the target server system. In some embodiments, the database is uploaded directly to the target server, wherein the database is supported by the hardware and software associated with the target server system. In some embodiments, the database may be maintained by the target entity associated with the target server system.

In some embodiments, prior to upload and migration of the database to the target server, the system may request verification of the database migration. In some embodiments, the system may request that the user confirm and verify the source and target servers before migration of the database commences. In some embodiments, the system may request that the user provide authentication information prior to migrating the database from the source server to the target server.

Referring now to FIG. 9 which provides a high level process flow for migrating a database to a virtual machine hosted on a target server 900, in accordance with one embodiment of the invention, the process 900, as illustrated in blocks 910-950, initially begins and proceeds similar to that of the previously described process 800, as illustrated in blocks 810-850. However, as illustrated in block 960 of FIG. 9, the system automatically uploads the database to a virtual machine installed on the target server system, wherein the virtual machine is hosted on the virtual machine installed on the target server system. A virtual machine is an operating system, system architecture, or the like that may imitate specific hardware, such as that of the source server. In some embodiments, the virtual machine installed on the target server system may emulate a system architecture or the like associated with the source server system. In this way, at least some compatibility issues may be overcome without needing to significantly alter, patch, or update the database to enable successful migration to and operation on the target server system. In some embodiments, the virtual machine may be maintained remotely on the target server system by the source entity associated with the source server system, wherein the source entity retains at least partial control over the maintenance of the now migrated database.

In some embodiments of the invention, the system may determine that a target virtual machine is not installed on the target server system on which the database may be hosted. The system may build a virtual machine and install the constructed virtual machine on the target server system. In some embodiments, the virtual machine may be built outside of the target server system such as on the source server system by the source entity, wherein the system transmits the build virtual machine to the target server system and installs the virtual machine. In this way, the source entity may retain greater control over the design of the virtual machine used to host the source entity's database. In some embodiments, in response to installing the virtual machine on the target server system, the system may upload the database to be hosted on the the target virtual machine installed on the target server system.

FIG. 6 provides a graphical representation of a portion of a server administration tool user interface 600, in accordance with one embodiment of the invention. In some embodiments, the administration tool may comprise a database migration tool and/or a server patching tool. The server administration tool allows for operation of the system by server administrators and database administrators of varying experience levels. In some embodiments, the administration tool may be installed and stored on a user device and/or other systems within the environment 100 as described with respect to FIG. 1. Referring now back to FIG. 6, the interface 600, allows the user to communicate and interact with the server administration tool and the system as a whole by inputting information and commands while receiving outputted information from the system. As illustrated in FIG. 6, in some embodiments, the server administration tool provides user selection and input fields 610 for the user to initiate a server search and, if necessary, provide authentication details to access one or more servers, such as a username and password. In the embodiment illustrated in FIG. 6, the server administration tool may refine the server search results by allowing the user to select one or more services, such as a database, application, or the like, that are stored on one or more servers within the source server system. In other embodiments, the tool may allow the user to search for servers based on other criteria such as a server name, storage location, contents, and/or other identifying information. In some embodiments, the server administration tool may further search for servers outside of the source server system such as an external server maintaining a database previously migrated from the source server system. The results of a server search are presented as a server list 620 within the server administration tool.

FIG. 6 further illustrates a series of tabs 630 for organizing functionalities for performing operations and/or analyses on the servers, in accordance with some embodiments of the invention. Upon selecting one of the tabs 630 within the server administration tool, the user may view and select one or more functionalities 640 under each tab. Upon execution of the one or more functionalities by the user, the results are presented in the output results field 650.

In the embodiment illustrated in FIG. 6, the server administration tool provides an operating system design and build (OS DB) tab with functionalities for checking application versions, updating servers, and running scripts or commands on the servers; an operating system operations (OS Ops) tab with functionalities for checking server ping, uptime, and the like; an operating system remediation (OS Remediation) tab with functionalities for comparing permissions attached to a server before and after patching; a compatibility tab with functionalities for patching servers and migrating databases; and a generic tab with varying functionalities. The functionalities 640 of the generic tab, according to the embodiment illustrated in FIG. 6, include a ping functionality for querying the status of a connection, a disk functionality for determining disk usage of a server, an operating system information (OS Info) functionality for retrieving version information and the like associated with the operating system, an uptime functionality for monitoring server uptime and downtime, a network interface card information (NIC Info) functionality for retrieving software version information and connection details associated with the network interface card, and an execute button to execute functionalities. Furthermore, any number of custom functionalities may be incorporated into the server administration tool such as proprietary or internal functionalities or applications. It should be noted that functionalities as described above are not specific to any single tab within the tool and that the placement of the functionalities within the tabs as described above is an example of a single embodiment of the invention.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

INCORPORATION BY REFERENCE

To supplement the present disclosure, this application further incorporates entirely by reference the following commonly assigned patent applications:

| U.S. patent application Ser. No. | Title | Filed On |
|---|---|---|
| 15/366,426 now published as 2018/0157653 | ENABLING MIGRATION OF RELATIONAL DATABASE TO A CLOUD NETWORK | Concurrently herewith |

What is claimed is:

1. A system for providing a server administration tool for patching a relational database enabling migration of the relational database to a cloud server environment, the system comprising:
   at least one memory device;
   at least one network communication interface connected to a network; and
   at least one processing device operatively coupled to the memory device and the network communication interface, wherein the processing device is configured to execute computer-readable program code to:
      launch a server patching tool on a user device associated with a user;
      generate and present a server list to the user, wherein the server list comprises servers associated with a source server system, and wherein the servers further comprise one or more databases;
      prompt the user to select at least one database stored on a source server for migration, wherein the source server is associated with the source server system;
      analyze the source server for potential patching errors, wherein the potential patching errors prevent a patch from successfully being applied to the source server;
      determine that the source server has at least one patching error, wherein the at least one patching error comprises one or more missing installation files, wherein the one or more installation files are required for successfully installing the patch;
      in response to determining that the source server has at least one patching error, temporarily denying an ability of the user to enter one or more commands to apply a patch to the source server;
      locate, automatically, the one or more missing installation files;
      in response to locating the one or more missing installation files, trigger an import of the one or more missing installation files to a system folder stored on the source server;
      determine that the at least one patching error has been eliminated by identifying that the installation of the one or more missing installation files is complete;
      determine that the installation of the one or more missing installation files has not created additional patching errors in the source server;
      in response to determining that the installation of the one or more missing installation files has not created additional patching errors in the source server, (i) restore the ability of the user to enter the one or more commands to apply a patch to the source server and (ii) patch the source server thereby enabling migration and upload of the at least one database to a target server associated with a target server system; and
      in response to patching the source server, upload the at least one database to the target server associated with the target server system.

2. The system of claim 1, wherein patching the source server further comprises transmitting a command to one or more servers via a command line at a back-end of each of the one or more servers instructing the one or more servers to install the patch, wherein the patch is installed simultaneously, in parallel on the source server and the one or more servers.

3. The system of claim 1, wherein analyzing the source server for at least one potential patching error further comprises:

analyzing the source server prior to an attempted patch;
determining that the attempted patch will not be successful;
preventing the attempted patch from initiating; and
generating and presenting, to the user via the user device, a message, wherein the message notifies the user that the attempted patch will not be successful.

4. The system of claim 1, wherein launching the server patching tool further comprises installing and storing the server patching tool on the user device associated with the user.

5. The system of claim 1, wherein the potential patching errors further comprise server label issues, application issues, and compatibility issues with other operating systems.

6. The system of claim 1, wherein uploading the at least one database to the target server further comprises uploading the at least one database to a virtual machine installed on the target server system, wherein the virtual machine hosts the at least one database on the target server system.

7. The system of claim 1, wherein the target server system is a cloud server system.

8. The system of claim 1, wherein patching the source server allows the at least one database stored on the source server to be compatible with the target server and successful migration and upload of the at least one database from the source server system to the target server system.

9. A computer program product for providing a server administration tool for patching a relational database enabling migration of the relational database to a cloud server environment, the computer program product comprising at least one non-transitory computer readable medium having computer-readable program code portions embodied therein, the computer-readable program code portions comprising:
an executable portion configured for launching a server patching tool on a user device associated with a user;
an executable portion configured for generating and presenting a server list to the user, wherein the server list comprises servers associated with a source server system, and wherein the servers further comprise one or more databases;
an executable portion configured for prompting the user to select at least one database stored on a source server for migration, wherein the source server is associated with the source server system;
an executable portion configured for analyzing the source server for potential patching errors, wherein the potential patching errors prevent a patch from successfully being applied to the source server;
an executable portion configured for determining that the source server has at least one patching error, wherein the at least one patching error comprises one or more missing installation files, wherein the one or more installation files are required for successfully installing the patch;
an executable portion configured for, in response to determining that the source server has at least one patching error, temporarily denying an ability of the user to enter one or more commands to apply a patch to the source server;
an executable portion configured for locating, automatically, the one or more missing installation files;
an executable portion configured for, in response to locating the one or more missing installation files, triggering an import of the one or more missing installation files to a system folder stored on the source server;
an executable portion configured for determining that the at least one patching error has been eliminated by identifying that the installation of the one or more missing installation files is complete;
an executable portion configured for determining that the installation of the one or more missing installation files has not created additional patching errors in the source server;
an executable portion configured for, in response to determining that the installation of the one or more missing installation files has not created additional patching errors in the source server, (i) restoring the ability of the user to enter the one or more commands to apply a patch to the source server, and (ii) patching the source server thereby enabling migration and upload of the at least one database to a target server associated with a target server system; and
an executable portion configured for uploading the at least one database to the target server associated with the target server system in response to patching the source server.

10. The computer program product of claim 9, wherein patching the source server further comprises transmitting a command to one or more servers via a command line at a back-end of each of the one or more servers instructing the one or more servers to install the patch, wherein the patch is installed simultaneously, in parallel on the source server and the one or more servers.

11. The computer program product of claim 9, wherein analyzing the source server for at least one potential patching error further comprises:
analyzing the source server prior to an attempted patch;
determining that the attempted patch will not be successful;
preventing the attempted patch from initiating; and
generating and presenting, to the user via the user device, a message, wherein the message notifies the user that the attempted patch will not be successful.

12. The computer program product of claim 9, wherein launching the server patching tool further comprises installing and storing the server patching tool on the user device associated with the user.

13. The computer program product of claim 9, wherein the potential patching errors further comprise server label issues, application issues, and compatibility issues with other operating systems.

14. The computer program product of claim 9, wherein uploading the at least one database to the target server further comprises uploading the at least one database to a virtual machine installed on the target server system, wherein the virtual machine hosts the at least one database on the target server system.

15. The computer program product of claim 9, wherein the target server system is a cloud server system.

16. The computer program product of claim 9, wherein patching the source server allows the at least one database stored on the source server to be compatible with the target server and successful migration and upload of the at least one database from the source server system to the target server system.

17. A computer implemented method for providing a server administration tool for patching a relational database enabling migration of the relational database to a cloud server environment, the computer implemented method comprising:
launching a server patching tool on a user device associated with a user;

generating and presenting a server list to the user, wherein the server list comprises servers associated with a source server system, and wherein the servers further comprise one or more databases;

prompting the user to select at least one database stored on a source server for migration, wherein the source server is associated with the source server system;

analyzing the source server for potential patching errors, wherein the potential patching errors prevent a patch from successfully being applied to the source server;

determining that the source server has at least one patching error, wherein the at least one patching error comprises one or more missing installation files, wherein the one or more installation files are required for successfully installing the patch;

in response to determining that the source server has at least one patching error, temporarily denying an ability of the user to enter one or more commands to apply a patch to the source server;

locating, automatically, the one or more missing installation files;

in response to locating the one or more missing installation files, triggering an import of the one or more missing installation files to a system folder stored on the source server;

determining that the at least one patching error has been eliminated by identifying that the installation of the one or more missing installation files is complete;

determining that the installation of the one or more missing installation files has not created additional patching errors in the source server;

in response to determining that the installation of the one or more missing installation files has not created additional patching errors in the source server, (i) restore the ability of the user to enter the one or more commands to apply a patch to the source server and (ii) patch the source server thereby enabling migration and upload of the at least one database to a target server associated with a target server system; and in response to patching the source server, uploading the at least one database to the target server associated with the target server system.

18. The computer implemented method of claim 17, wherein patching the source server further comprises transmitting a command to one or more servers via a command line at a back-end of each of the one or more servers instructing the one or more servers to install the patch, wherein the patch is installed simultaneously, in parallel on the source server and the one or more servers.

19. The computer implemented method of claim 17, wherein analyzing the source server for at least one potential patching error further comprises:

analyzing the source server prior to an attempted patch;

determining that the attempted patch will not be successful;

preventing the attempted patch from initiating; and generating and presenting, to the user via the user device, a message, wherein the message notifies the user that the attempted patch will not be successful.

20. The computer implemented method of claim 17, wherein launching the server patching tool further comprises installing and storing the server patching tool on the user device associated with the user.

* * * * *